United States Patent [19]

Holmes et al.

[11] 4,184,368
[45] Jan. 22, 1980

[54] OCEANIC WAVE MEASUREMENT SYSTEM

[76] Inventors: Robert A. Frosch, Administrator of the National Aeronautics and Space Administration, with respect to an invention of John F. Holmes, Bay St. Louis, Miss.; Ronald T. Miles, Slidell, La.

[21] Appl. No.: 951,423

[22] Filed: Oct. 16, 1978

[51] Int. Cl.² ............................................. G01C 13/00
[52] U.S. Cl. .................................................. 73/170 A
[58] Field of Search ................. 73/170 A, 290 B, 384, 73/386

[56] References Cited
U.S. PATENT DOCUMENTS

| | | |
|---|---|---|
| 3,301,047 | 1/1967 | Von Wald, Jr. et al. ......... 73/170 A |
| 3,408,864 | 11/1968 | Josephson ........................ 73/170 A |
| 3,449,950 | 6/1969 | Dale et al. ....................... 73/170 A |
| 3,534,599 | 10/1970 | Hoehne ............................ 73/170 A |

*Primary Examiner*—Gerald Goldberg
*Assistant Examiner*—Joseph W. Roskos
*Attorney, Agent, or Firm*—George J. Porter; John R. Manning; L. D. Wofford, Jr.

[57] ABSTRACT

An oceanic wave measurement system wherein wave height is sensed by a barometer mounted on a buoy. The distance between the trough and crest of a wave is monitored by sequentially detecting positive and negative peaks of the output of the barometer and by combining (adding) each set of two successive half cycle peaks. The timing of this measurement is achieved by detecting the period of a half cycle of wave motion.

7 Claims, 2 Drawing Figures

OCEANIC WAVE MEASUREMENT SYSTEM

ORIGIN OF THE INVENTION

The invention described herein was made in the performance of work under a NASA contract and is subject to the provisions of Section 305 of the National Aeronautics and Space Act of 1958, Public Law 85-568 (74 stat. 435; USC 2457).

BACKGROUND OF THE INVENTION

1. Field of the Invention

This invention relates to systems for the measurement of wave motion at sea, and particularly to a system for the accurate measurement of wave excursions.

2. General Description of the Prior Art

Heretofore, oceanic waves have been measured by a wide variety of instruments including electronic wave staffs, sub-surface pressure transducers, sonic devices, accelerometer devices, radar, infrared beams, photographs and lasers. Sufficient dissatisfaction has been expressed by users of known systems to call for a new look at this field of measurement. The difficulties in the past range from inaccuracies to complexity in cost. It is the object of this invention to provide a simple, and thus inexpensive, system without sacrificing accuracy.

SUMMARY OF THE INVENTION

In accordance with this invention, a barometer is mounted on a mast attached to a buoy. The barometer, of a type providing an electrical output, samples static air pressure at the variable heights to which it is moved by the buoy responsive to wave motion, producing a signal which rises and falls as waves move between troughs and crests. As a feature of this invention, the difference between each trough following a crest and each crest following a trough is detected to thus provide a complete examination of wave motion. This is accomplished by the sensing of a period of one-half cycle of each full cycle of wave motion and continuously deleting and adding half cycles of measurement, that is, deleting the oldest and adding the newest half cycle.

DESCRIPTION OF THE PREFERRED EMBODIMENT

Figure 1:
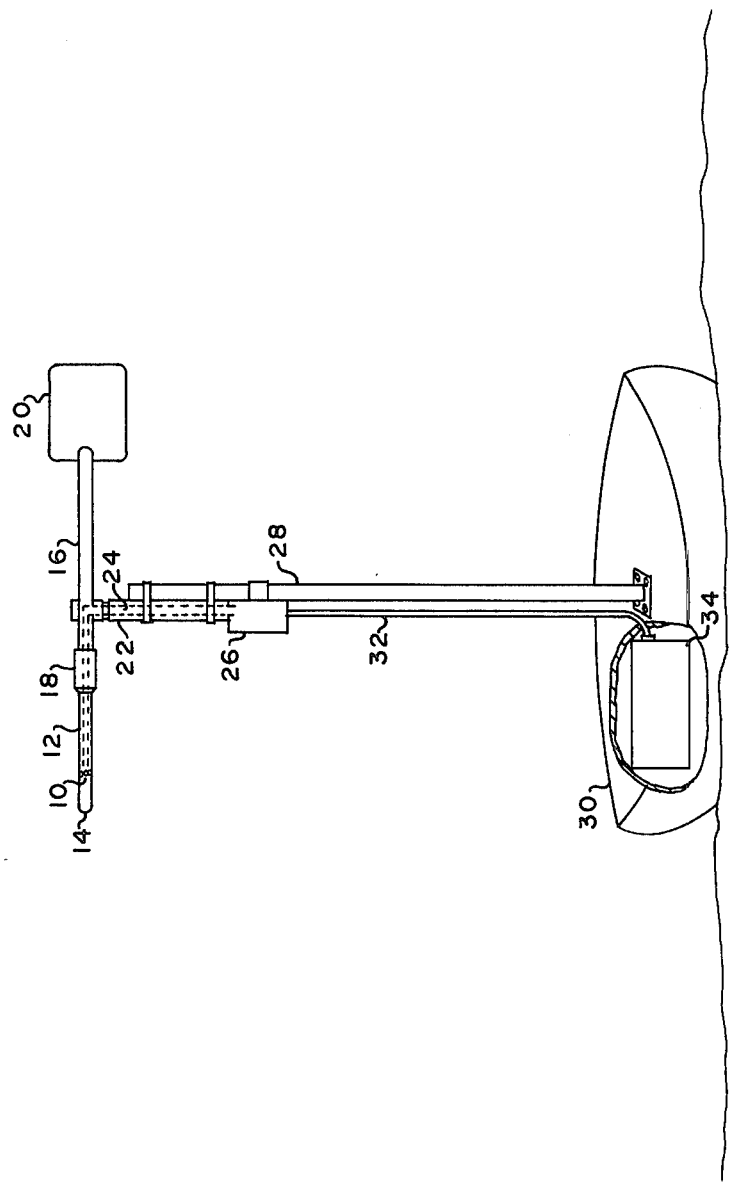
FIG. 1 is a pictorial view of the physical arrangement of components of the system of this invention.

Referring to FIG. 1, a series of openings 10 (e.g., six openings having a diameter of 0.2") in a tube 12 (e.g., 1 inch in diameter) having a closed end 14 would sample air pressure. Tube 12 is mounted on elongated support 16 having a balance weight 18 and vane 20 whereby tube 12 always points into the wind, and thereby samples static air pressure. Support 16 is rotably mounted on a sealed bearing 22, and air pressure is communicated through tube 12 and a tubular opening 24 in sealed bearing 22 to barometer 26. Bearing 22 and barometer 26 are supported by mast 28, in turn supported above water by buoy 30 and other floatable platforms, such as a ship. Typically with a buoy 30, the range of heights would be from approximately 1 meter to 10 meters above water.

Barometer 26 is of a type providing an electrical output which varies as a direct function of air pressure, such as, for example, Rosemont, Inc. (Minneapolis, Minnesota) Model 1201. Its electrical output is coupled via cable 32 to electronic circuitry contained in wave sensor package 34 located in buoy 30.

Figure 2:
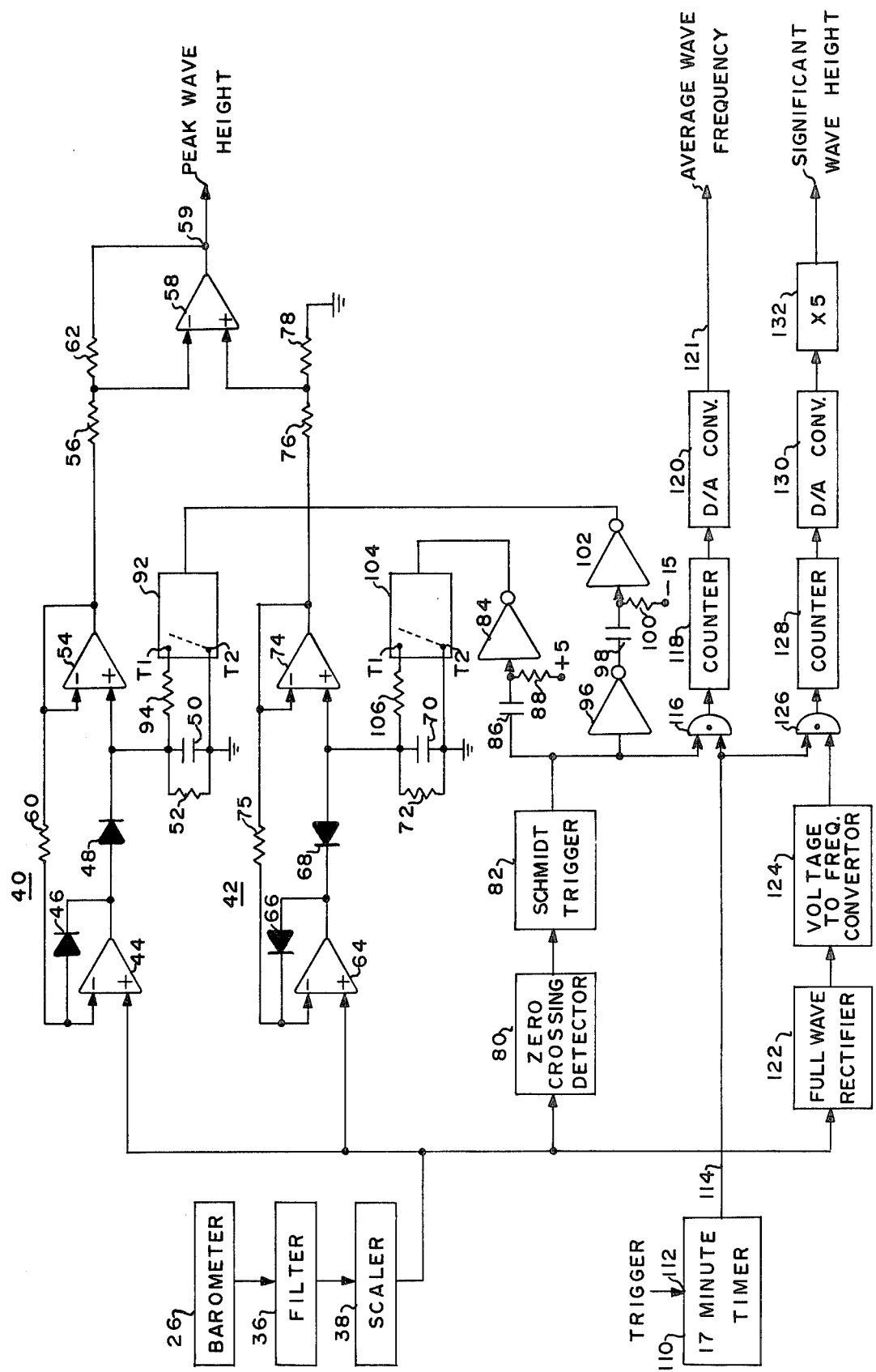
FIG. 2 is an electrical block diagram of an embodiment of the system of this invention.

Referring to FIG. 2, the electrical output of barometer 26 is fed to integrating filter 36, which is adapted to provide a flat response for signal periods in the narrow range of 5 to 20 seconds, or 0.05 to 0.2 Hz, which is considered to be the normal range of periods and frequencies for ocean waves in fully developed seas. The resulting electrical signal is an A.C. signal which approximates a sine wave. From filter 36 the signal is fed to scaler 38 which amplifies and scales the signal to provide the desired output range, e.g., 1.0 volt per meter of vertical displacement of barometer 26, as it is caused to move vertically responsive to wave motion. By locating barometer 26 relatively close, vertically, with respect to inlets 10, little error is introduced by virtue of acceleration effects on the mass of air in the air column between barometer 26 and air inlets 10. Where barometer 26 must be located substantially below the air inlets, as, for example, when barometer 26 must be mounted at or near buoy 30 at the base of a tall mast 28, it may be necessary to mount an accelerometer on mast 28 to correct for vertical acceleration effects on the air column which would, of course, appear in the air pressure detected by the barometer. In other words, pressure changes due to detected accelerations in such case would be subtracted from the barometer output.

The output of scaler 38 is fed to positive and negative peak detectors 40 and 42, respectively. As shown, positive peak detector 40 includes operational amplifier 44, and the signal input from scaler 38 is applied to the positive input of amplifier 44. The output of amplifier 44 is connected to the negative or inverting input of amplifier 44 through diode 46, which is polarized to provide total negative feedback during the negative input signal to amplifier 44, and thus the negative half cycle is effectively eliminated by this circuit. Positive excursion of the waveform is passed from the output of amplifier 44 by diode 48 to a holding circuit consisting of capacitor 50 and resistor 52, wherein capacitor 50 and resistor 52 have large values, for example, 22 mfd and 22 megohms, respectively; thus the peak output of amplifier 48 is effectively and temporarily stored on capicitor 50. This stored output is applied to the positive, non-inverting, input of isolation amplifier or follower 54 (its output is connected to its negative input for a no gain); and from the output of amplifier 54, this signal is fed through resistor 56 as one input to algebraically combining amplifier 58 (a differential amplifier which, in effect, adds positive and negative impedance). There is a feedback path from the output of amplifier 58 through resistor 62 of the same value as resistor 56 to the negative, inverting, input of amplifier 58 in order to effect unity gain in amplifier 58. There is negative feedback through resistor 60 from the output of amplifier 54 to the negative input of amplifier 44 to effect stabilization.

Negative peak detector 42 is similarly connected, employing an input operational amplifier 64 wherein the barometer signal is applied to the positive input, and the output of this amplifier is connected to its negative input through diode 66, oppositely poled to that of diode 46 to provide at the output of amplifier 64 only the negative excursion of a barometer signal. This negative excursion is passed by diode 68 to a negative peak holding circuit consisting of capacitor 70 and resistor 72 (identical to capacitor 50 and resistor 52). The voltage on this holding circuit is applied to the positive input of isolation amplifier or follower 74 connected in the same manner as amplifier 54 with feedback resistor 75 from its output to the input of amplifier 64. Its output is applied through gain balancing resistor 76 (of the same value as resistors 56 and 62) to the positive input of amplifier 58. The positive input to amplifier 58 appears across resistor 78 (of the same value as resistors 56, 62, and 76), connected between this input and ground, to which each of the elements of the holding circuit are also connected. This resistor, in conjunction with resistor 76, determines the signal value applied to the positive input of amplifier 58. Resistors 56, 62, 76, and 78 are of equal value to assure unity in gain in amplifier 58 and to insure that equal value signals are applied to the inputs of amplifier 58.

The operation of the peak wave detection circuitry is timed by timing circuitry consisting of zero crossing detector 80 and Schmidt trigger 82. The barometer signal from scaler 38 is supplied to the input of zero crossing detector 80, which is adapted to operate on a positive going portion of an input signal to provide a signal to Schmidt trigger 82. Responsively, Schmidt trigger 82 provides a positive square wave output corresponding in time to the positive half of the signal (that is, from the beginning of the positive half cycle to the beginning of the negative half cycle) from barometer 26. This square wave signal is applied to inverting amplifier 84 through a time constant circuit consisting of input series capacitor 86 and parallel resistor 88, which circuit is timed to provide for a selected short period (less than 10% of a half cycle) a triggering voltage through inverting amplifier 84 to solid state relay 92 (e.g., Teledyne type 640-1), which operates to provide a closed circuit across terminals T1 and T2. This closed circuit, or short, is connected through discharge resistor 94 (e.g., 1,000 ohms) across capacitor 50 preparatory to capacitor 50 receiving a new charge. Thus, this discharge would occur during a short period of the initial portion of the positive excursion of the barometer signal, and capacitor 50 thereafter would be free to charge to a new maximum positive value in accordance with the current positive excursion of the wave. In this manner, the positive peak detector is reset each time a signal change is in a positive direction.

The output of Schmidt trigger 82 is also fed through inverting amplifier 96 to a like circuitry arrangement which includes series capacitor 98 and parallel resistor 100 connected to the input of inverting amplifier 102. The output of inverting amplifier 102 is connected to solid state relay 104 like that of relay 92 and is responsive only to positive going signals. Thus, by virtue of the additional phase reversal produced by inverting amplifier 96, solid state relay 104 is enabled by the negative going or trailing portion of the square wave output of Schmidt trigger 82 occurring at the beginning of the negative half cycle of the barometer signal. Thus, relay 104 effects a closed circuit or shorting condition through discharge resistor 106 across capacitor 70 of negative peak detector 42 to reset capacitor 70 at the commencement of each negative half wave cycle. This thus enables peak detector 42 to store independently the peak of each negative signal of excursion from barometer 26.

In operation, each positive peak would be combined in amplifier 58 with the peak of the negative peak which followed that positive peak; and, in addition, each negative peak would be combined with the positive peak following it. This arises since reset of each positive sampling only ocurrs at the beginning of each positive sampling, and the sample remains through the occurrence of the negative sampling, and vice versa. Accordingly, the height of a wave is measured by measuring both the distance between a crest and a trough following that crest, and the distance between that same trough and the next crest following that trough. Such height measurement outputs are available from amplifier 58 on terminal 59.

As an added feature of this invention, the average frequency of wave motion for a discrete period, for example, 17 minutes, is provided. This is accomplished by providing a 17-minute conventional timer 110 which is operated by an external trigger input applied at a selected time to input 112. Upon the application of the trigger signal, timer 110 is caused to turn on and provide an enabling output signal on lead 114 which continues for 17 minutes, after which the timer shuts off and the enabling output signal terminates. This enabling output signal is applied to and enables AND gate 116 which is connected to then pass the square wave output of Schmidt trigger 82. As described above, this square wave output occurs for periods of each positive half cycle of the signal from barometer 26 and are counted by ripple counter 118 for the 17-minute period. In this manner, there is provided a digital output to digital-to-analog converter 120 which provides an output count proportional to the average frequency of wave motion over the 17-minute period. Where desired, this may be converted to cycles per any desired time period. Digital-to-analog converter 120 provides a voltage output on lead 121 proportional to the frequency of wave motion.

FIG. 2 also illustrates means for providing a signal representative of the significant wave height over a period of 17 minutes, the turn-on period of timer 110. This is accomplished by supplying the barometer signal from scaler 38 to full wave rectifier 122. The output of rectifier 122, being a series of pulses wherein the crests and troughs are now represented by like polarity pulses, are converted to a frequency or rate signal by voltage-to-frequency converter 124. Timing to effect averaging is provided by passing the signal through AND gate 126, which is enabled by the output of timer 110; and thus there is provided as an output of AND gate 126 a series of pulses for a period of 17 minutes which vary in number directly with the wave excursions occurring. These pulses are fed to counter 128 which counts them for the 17-minute period to thus provide a count which is proportional to the average absolute displacement of waves for the timed period. In order to provide this as an analog output, the output of counter 128 is fed through digital-to-analog converter 130 which provides an analog output representative of the average absolute displacement of the waves. Then by multiplying this average by 5 in multiplier 132, this output is converted to a signal representative of significant wave height, a standard measurement employed by oceanographers.

The outputs provided by the circuitry shown in FIG. 2 typically would be transmitted, on demand (by means not shown) from buoy 30 to a central station by means of conventional radio telemetry. Counters 118 and 128 would be resettable by conventional means, typically also controlled by radio telemetry and the application of a triggering signal to timer 110.

From the foregoing, it will be appreciated that the present invention provides a simple and basically reliable system of accurately measuring oceanic waves. Particularly, it is to be kept in mind that, uniquely, by holding positive and negative peak level signals representative of troughs and crests of waves, and combining peak level signals each half cycle period, a complete wave history can be obtained over a selected period of time.

Having thus described our invention, what is claimed is:

1. An oceanic wave measurement system comprising:
   air inlet means coupled to environmental air for providing an air pressure output corresponding to static air pressure;
   a barometer providing an electrical output responsive to said output of said air inlet means;
   a floatable base and means for mounting said air inlet means and said barometer on and above said floatable base;
   filter means responsive to the output of said barometer for providing an A.C. output signal in the frequency range of 0.05 to 0.2 Hz;
   positive peak detection and signal holding means responsive to the output of said filter means for detecting and temporarily storing cyclic positive peak voltages applied to it;
   negative peak detection and signal holding means responsive to the output of said filter means for detecting and temporarily storing cyclic negative peak voltages applied to it;
   zero crossing detection means responsive to an A.C. signal from said filter means for providing an output each time that a signal crosses a zero signal level;
   trigger means responsive to the output of said zero crossing detector for applying an initiation signal, alternately, to said positive and negative peak detectors for resetting said detectors, whereby there continues detected the last occurring positive and negative voltages peaks; and
   summing means responsive to said negative and positive peak detection means and the last occurring positive and negative peaks for providing as an output a signal representative of the distance between the minimum and maximum excursion of the last full cycle of wave movement.

2. An oceanic wave measurement system as set forth in claim 1 further comprising:
   timing means for providing, responsive to an input signal, an enabling output for a selected period of time;
   gating means responsive to an output of said zero crossing detector and a said enable signal for providing, as an output, pulses from said zero crossing detector during the appearance of said enable signal; and
   counting means responsive to the output of said gating means for providing, as an output, a count representative of the full cycles of wave movement during said selected period.

3. An oceanic wave measurement system as set forth in claim 2 further comprising:
   full wave rectification means responsive to the output of said filter means for providing, as an output, successive pulses of a single polarity wherein one of two adjacent pulses is representative of the height of a wave crest, and the other the height of a wave trough, and the average amplitude of the pulses is indicative of the average amplitude of wave excursions from an average level.

4. An oceanic wave measurement system as set forth in claim 3 further comprising voltage-to-frequency conversion means responsive to the output of said full wave rectification means for providing, as an output, a frequency proportional to the amplitude of said pulses.

5. An oceanic wave measurement system as set forth in claim 4 further comprising:
   second counting means; and
   second gating means responsive to the output of said voltage-to-frequency conversion means and said timing means for providing output pulses to said second counting means during a period in which said second gating means is enabled, and said total count of said second counting means being representative of the average absolute displacement of waves sensed during said selected period.

6. An oceanic wave measurement system as set forth in claim 5 further comprising digital-to-analog conversion means responsive to the output of said second counting means for providing an analog output representative of said average absolute displacement of wave heights.

7. An oceanic wave measurement system as set forth in claim 6 further comprising multiplication means coupled to said digital-to-analog conversion means for multiplying said signal representative of the average displacement of wave height by 5, and thereby providing an output representative of significant wave height.

* * * * *